United States Patent Office 2,917,691
Patented Dec. 15, 1959

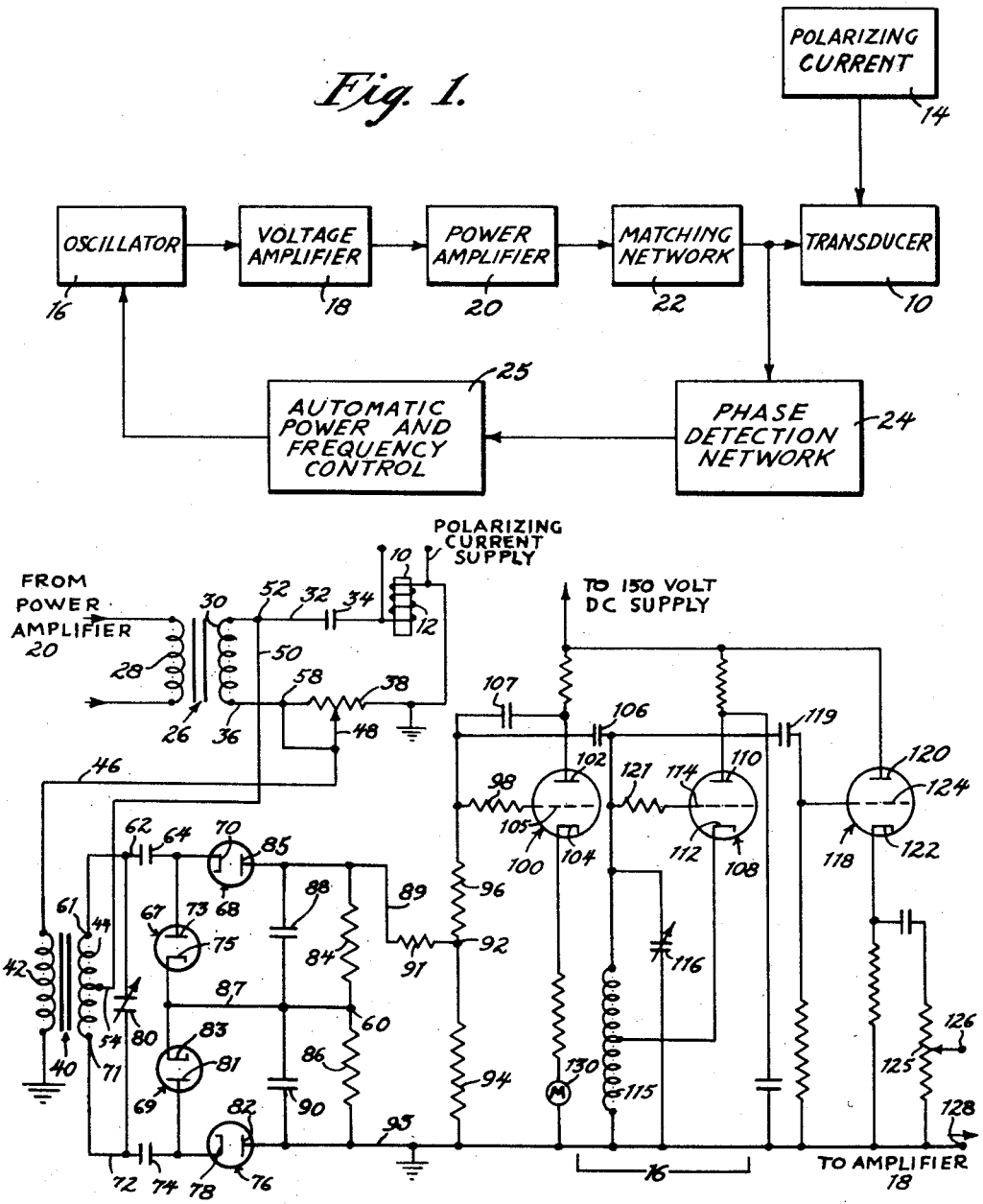

2,917,691

AUTOMATIC POWER AND FREQUENCY CONTROL FOR ELECTROMECHANICAL DEVICES

Carmine F. De Prisco, William C. Elmore, and Nicholas Maropis, West Chester, Pa., assignors to Aeroprojects, Inc., West Chester, Pa., a corporation of Pennsylvania Application July 10, 1956, Serial No. 596,983

7 Claims. (Cl. 318—118)

This invention relates to a power control system for electromechanical devices and to an automatic control system which has particular utility for maintaining the power output of a magnetostrictive device at a pre-set level. The control system of the invention also has utility in detecting and measuring physical phenomena, such as transient shock waves and the like, which affect the physical characteristics of an electromechanical device, such as a magnetostrictive transducer.

A problem which has created considerable difficulty in the use of tools embodying mangetostrictive transducers is the fact that there is a tendency for the power levels of such transducers to be sharply reduced with changes in output load conditions. An unloaded magnetostrictive transducer has a natural mechanical resonant frequency which depends upon various physical characteristics of the transducer, including its length and cross-sectional area. However, when the transducer is operating under load, the natural resonant frequency of the transducer easily changes due to such causes as physical loading applied to the transducer, sliding of the transducer along rough or smooth surfaces, and temperature changes. For maximum power transfer, it is essential that the alternating current supply to the transducer have a frequency which always corresponds to that of the transducer resonant frequency.

Accordingly, it is an object of this invention to provide an automatic control system which senses departures of an electromechanical device from a pre-set operating condition and makes corresponding changes or corrections to compensate for such departures.

It is a further object of this invention to provide an automatic control system for use with an electromechanical device of the type in which a departure of the device from a pre-set operating condition manifests itself as a change in phase between the supply voltage and current to the electromechanical device.

It is a still further object of this invention to provide an automatic control system to maintain the power output of an electromechanical device, such as a magnetostrictive transducer, continuously at a peak power level by maintaining voltage and current input to the device in proper phase relation.

It is another object of this invention to provide an automatic power control system for sensing changes in the resonant frequency of a magnetostrictive transducer and for correspondingly changing the frequency of the alternating current power supply to the transducer.

It is still another object of this invention to provide a control circuit for maintaining the voltage and current supply to a magnetostrictive device in proper phase relation by sensing deviations from this phase relation and initiating corrective measures.

It is a further object of this invention to provide a control system which senses changes in the load conditions of an electromechanical device, such as a magnetostrictive transducer, and which gives some analogous indication of such load changes, such as an electrical indication.

In the achievement of these objectives, there is provided in accordance with this invention a control system which senses changes in the physical loading on an electromechanical device by detecting changes in the phase relation between the supply voltage and current to the device.

In an embodiment of the invention, the control systed effectively senses any difference between the frequency of the alternating current supply to a magnetostrictive transducer and the transducer resonant frequency, and correspondingly varies the supply frequency to continuously conform to the changed transducer resonant frequency. Any departure of the resonant frequency of the transducer from the supply frequency manifests itself as a phase change between the current and the voltage in the A.-C. supply circuit to the transducer. In the control system of the invention, voltage signals representing the A.-C. supply voltage and the A.-C. supply current are separately supplied to a phase-detector circuit which detects the phase difference between the A.-C. supply voltage and current and provides an output signal having a magnitude and polarity which is a function of the magnitude and direction of the phase difference. The phase detector output signal is applied to a reactance tube circuit which effectively is a reactive component in the parallel resonant or tank circuit of the A.-C. supply oscillator which constitutes the alternating current supply of the transducer. A change in the amplitude of the phase detector output signal varies the reactance offered by the reactance tube to the oscillator tank circuit and thus varies the oscillator output frequency to conform to the changed resonant frequency of the transducer. The oscillator output signal is coupled into the supply circuit to the transducer through a conventional cathode follower circuit for impedance matching purposes and is subsequently amplified by voltage and power amplifiers and coupled through a matching network to the transducer. Thus, the frequency of the A.-C. power supply for the transducer is controlled as a function of the voltage-current phase relation in the transducer supply circuit, and thus as a function of the relation of the A.-C. supply frequency to the transducer resonant frequency.

For the purpose of illustrating the invention there is shown in the drawings a form which is presently preferred; it being understood, however, that this invention is not limited to the precise arrangements and instrumentalities shown.

Further objects and advantages of the invention will become apparent from the following description taken in conjunction with the accompanying drawing, in which:

Figure 1 is a block diagram of the power supply and control circuit for the mangetostrictive transducer; while Figure 2 is a circuit diagram showing details of the phase detection network, of the supply oscillator, and of the automatic power and frequency control circuit.

Referring now to the drawings, the magnetostrictive transducer is indicated at 10 and includes a core formed of laminated magnetostrictive material of a suitable metal, such as nickel, Permendur (a cobalt-iron alloy), etc. The magnetostrictive transducer includes a winding 12 which is connected to a direct current voltage supply 14 which serves as a source of polarizing voltage. Winding 12 is also connected to a source of alternating current voltage of a predetermined desired frequency, such as 15,000 cycles per second, the alternating current voltage being superimposed on the polarizing voltage to produce vibrations of the magnetostrictive core at the frequency of the A.-C. supply, as is well known in the art. It will, of course, be readily understood by those skilled in the art that a pair of windings may be utilized instead of winding 12, such as one winding for polarization and the other winding for alternating current.

The A.-C. supply is indicated in the block diagram of Figure 1 by block 16 which designates an oscillator whose frequency is continuously conformed to the resonant frequency of the transducer. The output of oscillator 16 is fed to a voltage amplifier 18, hence to a power amplifier 20, thence to a matching network 22, and thence to winding 12 of the transducer.

In accordance with the invention, a phase detection network generally indicated at 24 is interposed between matching network 22 and transducer 10 and senses the phase relation of the A.-C. supply current to the A.-C. supply voltage at the input to transducer 10. The phase detection network feeds any signal which results from a detected phase change to an automatic power and frequency control device indicated by block 25. Automatic power and frequency control device 25 is connected to oscillator 16 and readjusts the frequency of the oscillator to conform to the new resonant frequency of the transducer in accordance with the output signal of phase detector network 24. The output power level of the transducer is thereby maintained constant.

Referring now more specifically to the circuit diagram of Figure 2, the voltage output of power amplifier 20 is applied to primary winding 28 of transformer 26, a part of matching network 22. The secondary winding 30 of transformer 26 is connected by conductor 32 to one side of winding 12 of transducer 10 in series with a condenser or capacitor 34. Capacitor 34 serves a twofold purpose in this circuit; first it blocks the D.C. polarizing current from the output transformer 26, and second, its value is selected so that the admittance of the load as seen by transformer 26 is a maximum at or near the transducer resonant frequency. The other side of secondary winding 30 is connected to the opposite end of transducer winding 12 by a conductor 36 in series with resistor 38. The junction of resistor 38 and this opposite end of transducer winding 12 is also connected to ground. Resistor 38 is a part of the phase-sensing circuit, and the voltage drop across resistor 38 provides a voltage which is approximately in phase with the current through the transducer. This voltage, therefore, shall henceforth be referred to as the "current vector."

The phase detector circuit is essentially a standard discriminator circuit and includes a transformer generally indicated at 40, having a primary winding 42 and a secondary winding 44. One end of primary winding 42 is connected by conductor 46 to an adjustable tap 48 on current sensing resistor 38. The opposite side of primary winding 42 is connected to ground. Thus, the voltage across primary winding 42 of transformer 40 is equal to the voltage drop between tap 48 on resistor 38 and ground. This voltage drop is in phase with the supply current to transducer winding 12, since the voltage across and current through a resistance are in phase with each other. This voltage applied to primary winding 42 is coupled to the secondary winding 44 of transformer 40 by electromagnetic induction.

In order to provide a voltage vector to the phase detecting network indicative of the phase of the supply voltage to the transducer, one side of the input voltage is connected by conductor 50 from junction 52 of conductor 32 to the center tap 54 of secondary winding 44. Junction 52 lies intermediate the terminal of secondary winding 30 of transformer 26 and the adjacent terminal of condenser 34.

Terminal 61 of secondary winding 44 is connected by conductor 62 in series with condenser 64 to the cathode 70 of a diode rectifier tube generally indicated at 68 and plate 73 of a second diode rectifier generally indicated by 67. In a similar manner, the opposite terminal 71 of secondary winding 44 is connected by conductor 72 in series with condenser 74 to cathode 78 of a third diode rectifier tube generally indicated at 76 and to plate 81 of a fourth diode rectifier tube generally indicated at 69. A variable condenser 80 is connected across the output of secondary winding 44 between conductors 62 and 72 in advance of the condensers 64 and 74. Condenser 80 is used to tune the secondary of the transformer 40 to the transducer resonant frequency. The anodes 82 and 85 of the respective rectifier tubes 68 and 76 are connected to opposite ends of a pair of series-connected resistors 84 and 86. A smoothing condenser 88 is connected in parallel with resistor 84 and a smoothing condenser 90 is connected in parallel with resistor 86. Cathodes 75 and 83 of diode tubes 67 and 69 are connected together and through conductor 87 to the common terminus of capacitors 88 and 90 and resistors 84 and 86. In practice, diode tubes 67 and 69 may be in common envelopes with diode tubes 68 and 76.

The phase detector output signal voltage obtained across the series connected resistors 84 and 86 is fed to a reactance tube 100 having an anode 102, a cathode 104 and a control grid 105. The phase detector output voltage is fed by conductor 89 in series with resistor 91 and by conductor 93 to junction 92 and ground, respectively, of a resistance network connected in the input circuit to grid 105 of reactance tube 100. The resistance network includes resistors 94, 96 and 98.

The grid 105 of reactance tube 100 is coupled through buffer resistor 98 and condenser 106 to the parallel-resonant or tank circuit of the vacuum tube oscillator generally indicated at 16. Oscillator 16 includes a three element vacuum tube 108 having an anode 110, a cathode 112, and a control grid 114. Control grid 114 is connected to the parallel resonant or tank circuit including inductance 115 and tuning condenser 116 through resistor 121. Oscillator 16 is a conventional Hartley oscillator utilizing feed-back between the ground-to-cathode portion of inductance 115 and the cathode-to-grid portion of the inductance. Tube 100, utilizing the well known "Miller Effect" acts as a reactance in parallel with the oscillator tank circuit. The input capacitance of this tube varies as the tube transconductance, which is controlled by the grid-to-cathode voltage. Consequently, the phase detector output signal applied to grid 105 of reactance tube 100 varies the reactive effect of reactance tube 100 upon the oscillator tank circuit and thereby varies the output frequency of the oscillator.

The output of oscillator 16 is connected to a standard cathode follower circuit, including a three element vacuum tube 118 having an anode 120, a cathode 122 and a control grid 124. Control grid 124 is coupled to the tank circuit of oscillator tube 108 through a condenser 119. The output signal from the cathode follower circuit is obtained across terminals 126 and 128 of a variable resistor 125 in the ground-to-cathode circuit of tube 118, the output from these terminals being connected to amplifier 18. The voltage at terminals 126 and 128 has a frequency conforming to the resonant frequency of the transducer.

A milliammeter 130 may be placed in the plate or cathode circuit of reactance tube 100 to indicate the phase shift which occurs, this milliammeter being suitably calibrated in terms of the particular phenomenon being observed.

The operation of the present invention is as follows:

The alternating current voltage is supplied at a predetermined frequency, such as 15,000 cycles per second, for example, to the transducer winding 12 from oscillator 16 through amplifiers 18 and 20 and matching network 22. The frequency of the oscillator 16 corresponds to the natural resonant frequency of the magnetostrictive transducer.

Any departure of the magnetostrictive transducer from a resonant frequency corresponding to the supply frequency under load conditions manifests itself as a change in phase between the voltage and current in the alternating current supply circuit to transducer winding 12. A voltage having a phase vector representing the supply current is connected across primary winding 42 of the phase detector circuit.

The current vector responsive signal applied across primary winding 42 of the phase detector circuit appears across secondary winding 44 with a phase relation which is substantially in quadrature with respect to the voltage vector responsive signal at the secondary winding center tap 54.

Under ideal conditions, i.e., with no phase difference between the voltage and current in the transducer supply circuit and thus between the input signals applied to the phase detector, there will be the conventional quadrature relationship between the current responsive signal across the transformer secondary winding 44 and the voltage responsive signal at the secondary winding center tap 54, with a resulting equality of the vector sum and vector difference signals appearing across load resistors 84 and 86, respectively.

However, any phase difference between the voltage and current vectors applied to the phase detector caused by a difference between the transducer resonant frequency and the A.-C. supply frequency will result in a phase change from the ideal quadrature relationship between the voltage responsive and current responsive signals. As a result, the vector sum and difference signals respectively applied across resistors 84 and 86 will differ in magnitude, causing the phase detector output signal voltage across the series combination of resistors 84 and 86 to have a magnitude and polarity corresponding to the magnitude and direction of the phase difference between the transducer supply current and voltage.

As ideal conditions may not necessarily exist at maximum power delivery, the operating bias or grid-to-cathode voltage is adjusted by the resistance network consisting of resistances 91 and 94 so that the transducer is resonant at the proper voltage current phase relation through the transducer.

The phase detector output signal across resistors 84 and 86 of the phase detection circuit is connected to the input circuit of reactance tube 100. Reactance tube 100 is essentially in parallel with the parallel resonant circuit of oscillator 16 and operates as a reactance associated with the tank circuit of the oscillator. The phase detector output signal is applied to grid 105 of reactance tube 100 through a resistance network including resistors 91, 94, 96, 98 in such manner as to vary the transconductance of the reactance tube, thus varying the effective reactance value of the reactance tube in the tank circuit of oscillator 16. Thus, by varying the reactance of the reactance tube, the reactance of the tank circuit of the oscillator is varied to vary the oscillator output frequency to conform the oscillator output frequency to the new resonant frequency of the transducer.

The output of the oscillator is coupled to the amplifier 18 through a standard cathode follower cicuit which effectively isolates the oscillator from the amplifier stages. The output frequency is then fed through the amplifiers 18, 20 and the matching network 22 to the transducer at a frequency which corresponds to the changed resonant frequency of the transducer.

While the circuit arrangement hereinbefore described is intended principally for use in maintaining constant power input to a magnetostrictive transducer device, the control system also has utility in any electromechanical system whose characteristics are such as to cause a relative phase shift between current and voltage. For example, the control circuit may be utilized to detect the pressure and impulse in a transient shock wave by detecting the changes in pressure of the wave front as it strikes a responsive device such as a magnetostrictive transducer. In such case, the shock wave would change the resonant frequency of the transducer in a manner similar to the changes caused by the application of load, causing a phase shift and/or a frequency change having values indicative of the characteristics of the transient shock wave. In a similar manner, the phase detection and frequency control circuit hereinbefore described by utilizing voltage-to-current phase shifts caused by such conditions as a measurement of the conditions being observed, could be used to determine the pressure exerted between two or more bodies or the out-of-roundness or concentricity of rotating bodies or machinery.

The present invention may be embodied in other specific forms without departing from the spirit or essential attributes thereof and, accordingly, reference should be made to the appended claims, rather than to the foregoing specification as indicating the scope of the invention.

We claim:

1. In combination, an electromechanical device connected to an alternating current power supply, said device having a mechanical resonant frequency which changes when loading is applied to said device to thereby cause a difference in phase between the supply voltage and current to said device, means for detecting a phase difference between the supply voltage applied to said device and current to said device, and means coupled to and actuated by said phase detecting means for readjusting the frequency of said power supply in accordance with the detected phase difference to continuously conform the frequency of said supply to the resonant frequency of said device.

2. In combination, an electromechanical device having a mechanical resonant frequency which changes when loading is applied to said device, an alternating current power supply including an electronic oscillator connected to said device, a phase detection means connected to said electromechanical device to detect a phase difference between the voltage and current in the direct circuit to said device caused by changes in the mechanical resonant frequency of said device, and means coupled to and actuated by said phase detection means to readjust the frequency of said electronic oscillator to continuously conform the frequency of said oscillator to the resonant frequency of said device.

3. In combination, an electromechanical device having a mechanical resonant frequency which changes when loading is applied to said device, an alternating current power supply including a vacuum tube oscillator connected to said device, said vacuum tube oscillator having a tuned circuit which controls the output frequency of said oscillator, a phase detection means connected to said electromechanical device to detect a phase difference between the voltage and current directly in the circuit to said device caused by changes in the mechanical resonant frequency of said device, a variable reactance means coupled to said tuned circuit of said oscillator, and means connecting said phase detection means to said variable reactance means to vary the value of said reactance means in accordance with the phase difference detected by said phase detection means whereby the frequency of said oscillator is varied to conform to the resonant frequency of said device.

4. In combination, a magnetostrictive transducer, an alternating current power supply including a vacuum tube oscillator connected to said transducer, said oscillator including a tuned circuit which controls the output frequency of said oscillator, said transducer being of the type in which a differential between the resonant frequency of the transducer and the supply frequency causes a phase difference between the alternating voltage and current supply to the transducer, a phase detection circuit connected to said transducer to detect any phase difference between the supply voltage and current to said transducer, a variable reactance, means coupling said phase detection circuit to said variable reactance to vary the value of said reactance in accordance with detected phase differences, and means coupling said reactance to said input circuit of said oscillator to correspondingly vary the frequency of said oscillator to conform to the resonant frequency of said transducer.

5. In combination, a magnetostrictive transducer, an alternating current power supply for said transducer including a vacuum tube oscillator, said oscillator including a tuned circuit which controls the output frequency of said oscillator, said transducer being of the type in which a differential between the resonant frequency of the transducer and the supply frequency causes a phase difference between the alternating voltage and current supply directly to the transducer, a phase detection circuit connected across the input of said transducer to detect any phase difference between the supply voltage and current directly to said transducer, said phase detection circuit having an output signal representative of the detected phase difference, a reactance tube connected to the tuned circuit of said oscillator, and means connecting the output signal of said phase detection circuit to said reactance tube to vary the effective reactance of said reactance tube in said tuned circuit, to thereby change the output frequency of said oscillator to conform to the resonant frequency of said transducer.

6. In combination, an electromechanical device adapted to be mechanically vibrated, an alternating current supply winding coupled to said device, a transformer coupled to said winding, a resistor in series with said winding, a lead coupled to said resistor and to the primary winding of a second transformer, a phase detector circuit, the secondary winding of said second transformer being connected to said phase detector circuit, and a lead connected between the secondary winding of said first transformer and the secondary winding of said second transformer.

7. In combination, a magnetostrictive device adapted to be vibrated, an alternating current supply winding coupled to said device, a transformer coupled to said winding, a resistor in series with said winding, a second transformer, an adjustable electrical connection to said resistor coupled between said resistor and the primary winding of said second transformer, a phase detector circuit, the secondary winding of said second transformer being coupled to said phase detector circuit, and a lead connected between the secondary winding of said first transformer and the midpoint of the secondary winding of said second transformer.

References Cited in the file of this patent

UNITED STATES PATENTS

| | | |
|---|---|---|
| 2,498,760 | Kreithen | Feb. 28, 1950 |
| 2,504,831 | Griss | Apr. 18, 1950 |
| 2,553,251 | Gutterman | May 15, 1951 |
| 2,745,998 | McPherson | May 15, 1956 |